Oct. 11, 1966   F. S. KRAUJALIS   3,277,690
FORMING MACHINE
Filed Sept. 9, 1963   4 Sheets-Sheet 3
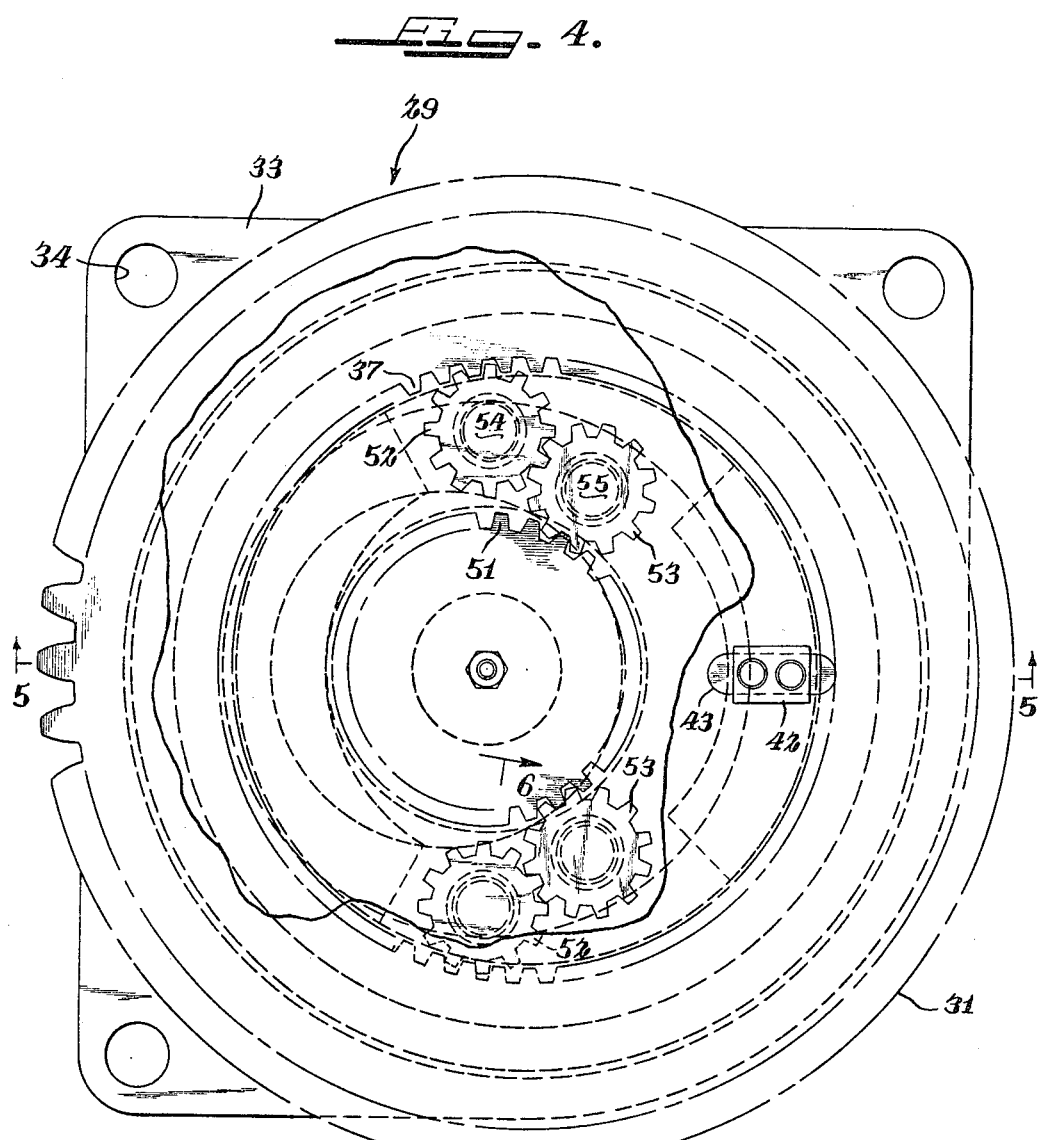
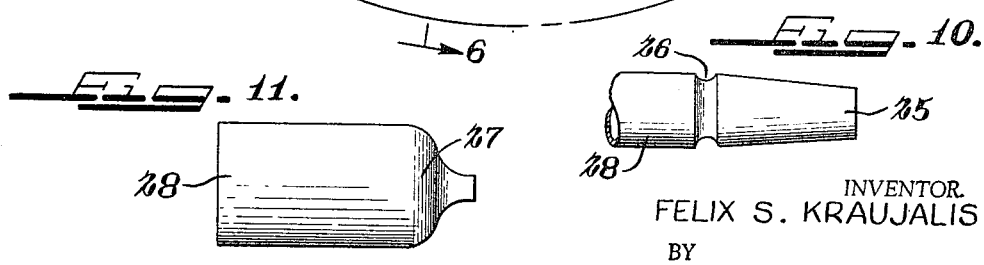
INVENTOR.
FELIX S. KRAUJALIS
BY
Charles H. Redman
Atty.

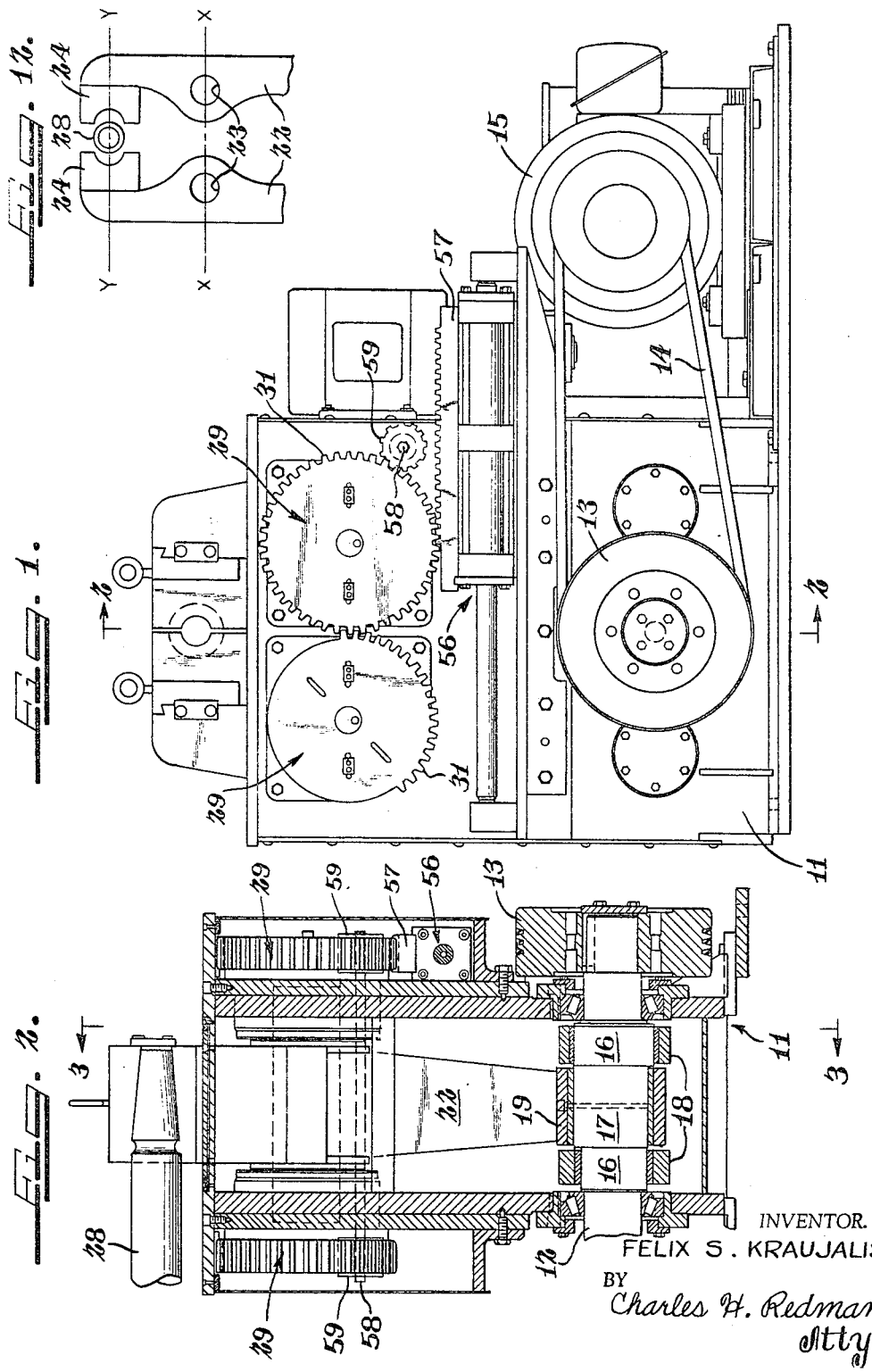

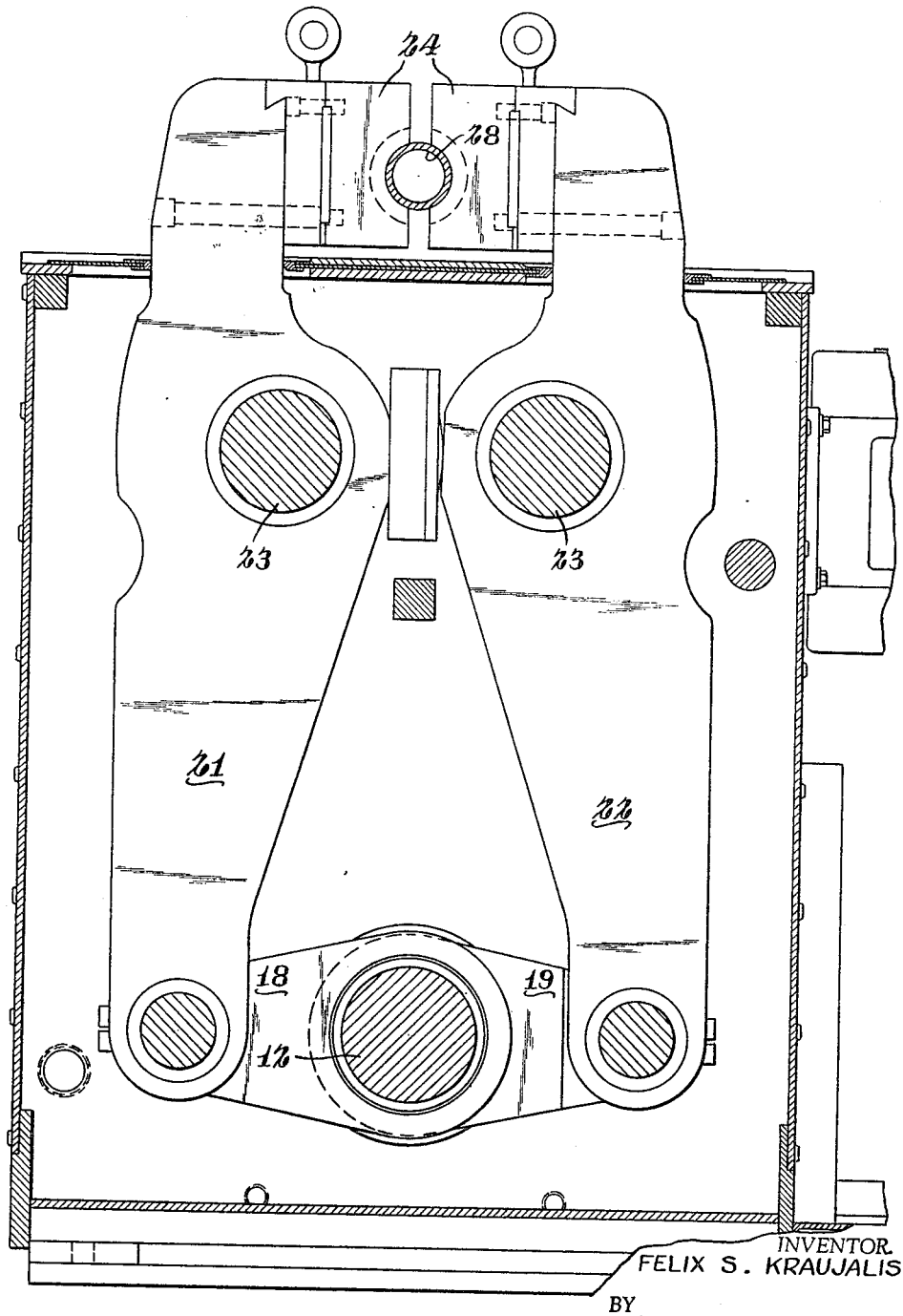

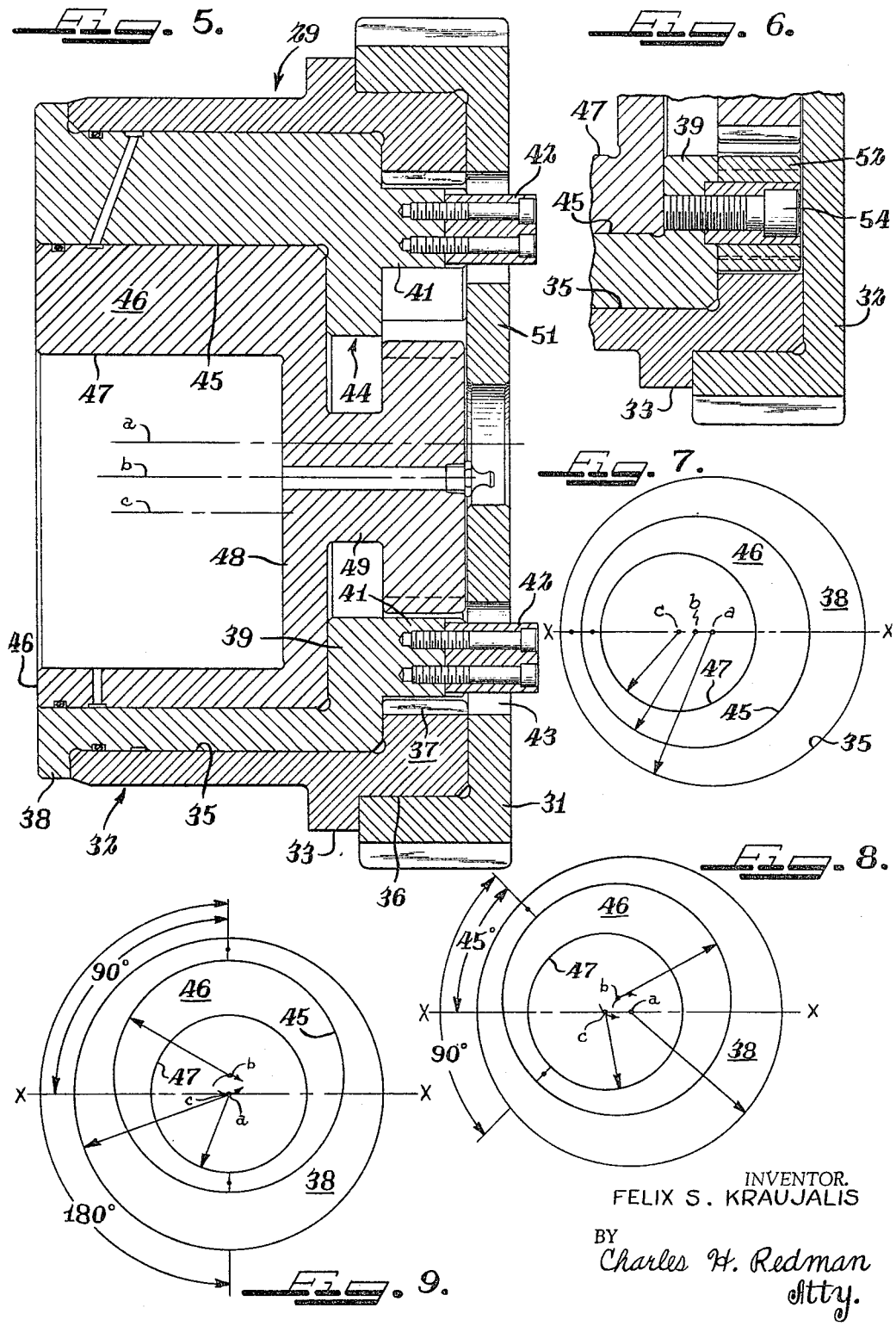

United States Patent Office 3,277,690
Patented Oct. 11, 1966

3,277,690
FORMING MACHINE
Felix S. Kraujalis, Chicago, Ill., assignor to Pines Engineering Co., Inc., Aurora, Ill., a corporation of Illinois
Filed Sept. 9, 1963, Ser. No. 307,711
5 Claims. (Cl. 72—409)

The present invention relates to improvements in forming machines and is more particularly concerned with apparatus useful for deforming tubular stock to taper it longitudinally, or to provide grooves, ribs, ridges, etc. along a length of tubular stock, and for bottle necking and the like.

Machines used for performing the foregoing operations employ a pair of die block components between which the work-piece is located, which die block components are carried on jaw arms that are journalled intermediate their ends and are oscillatably rocked so as to cause the die block components to repeatedly hammer or compress the work-piece. In known machines, as the work-piece deforming progresses, the arm journals are moved toward one another in an arc which results in the axes of the die block components being shifted vertically relative to the axis of the work-piece. This has been found to be highly objectionable for many reasons including the fact that such repositioning of the die block components during a forming operation tends to distort and mar the work-piece, thus necessitating a finishing or polishing operation before the work product is merchantable.

The present machine, disclosed herein in an exemplary embodiment, involves adjustable journals of novel construction in which the jaw arms are pivoted so that the pivots of said arms move toward one another in a straight line during the forming operation and which are quickly adjusted to carry the die components into an open position for the admittance and removal of a work-piece. In general, such a machine embodies a pair of opposed upstanding jaw arms that are pivotally journalled between their ends and which have eccentric drive means at their lower ends for oscillatably rotating the arms during machine operation. The other or upper arm ends carry matching forming die block components that embrace the work-piece extended between them and which function to intermittently apply pressure on said work-piece while the latter is being rotated or spun. As deformation of the work piece progresses, the die block components in known machines are progressively advanced toward one another through the progressive arcuate advancement of the pivotal arm mountings toward one another.

As stated hereinabove, such arcuate advancement of the die block components carries the die block components out of register with the longitudinal axis of the work-piece thus resulting in imperfections in the finished product.

In the present embodiment the advancement of the pivotal mountings takes the form of a straight line so that the vertical positions of the die block components remain constant with respect to the axis of the work-piece and thereby avoids distortion of the work-piece or the marring thereof. This is accomplished by the provision of a novel structure for the jaw arm bearing journals. As disclosed herein, each bearing journal involves a series of interrelated eccentrics rotatable in opposite directions by common means so as to carry the pivotal mountings toward and away from one another in a straight line as distinguished from the arcuate path formerly attained.

It is, therefore, an object of the invention to provide a forming machine of novel construction.

Another object is to provide a set of jaw arms and mounting therefor of novel construction.

Still another object is to provide novel bearing journals for pivotally mounted jaw arms in a forming machine.

Another and still further object is to provide a novel mechanical movement.

A further object is to provide novel means for moving the pivotal axes of a pair of jaw arms toward and away from each other in a straight line during machine operation.

Yet another object is to provide a machine of the character referred to which is not too expensive to construct, is easy to maintain, and highly efficient in operation.

The structure by means of which the above noted and other advantages and objects of the invention are attained will be described in the following specification, taken in conjunction with the accompanying drawings, showing a preferred illustrative embodiment of the invention, in which:

FIG. 1 is an end elevational view of an exemplary type of forming machine embodying features of the invention;

FIG. 2 is a vertical sectional view taken substantially on line 2—2 of FIG. 1;

FIG. 3 is an enlarged vertical sectional view taken along line 3—3 of FIG. 2, showing both jaw arms;

FIG. 4 is an enlarged elevational view, partly broken away, of one of the jaw arm bearing journals;

FIG. 5 is a sectional view taken substantially on line 5—5 of FIG. 4;

FIG. 6 is a sectional detail view taken on line 6—6 of FIG. 4;

FIGS. 7, 8 and 9 are schematic views of the bearing journal eccentrics illustrating various relative positions attained during successive adjustments thereof;

FIGS. 10 and 11 are representative of two forms of articles produced by the machine; and, FIG. 12 is a diagrammatic view showing the path of travel of the die block components and arm pivots.

Referring to the accompanying drawings which illustrate an exemplary embodiment of the invention, the disclosed forming machine includes a frame structure 11 in which is journalled, at the lower end thereof, a double eccentric shaft 12 having a pulley 13 on the outwardly extending end thereof and over which is trained a belt 14 for drivingly connecting said shaft with a power source, such as motor 15. The shaft 12 includes opposed eccentrics 16–17 upon which are journalled respectively, pitmans 18, 19 one connected to the lower end of each of a pair of upstanding jaw arms 21, 22.

Each jaw arm has a journal trunnion 23 between its ends and each mounts at its free upper end a die block component 24. In the present embodiment the die block components are shaped to embrace and form tubular stock substantially in a shape best illustrated in FIG. 10 wherein one end 25 is tapered and is formed with an annular channel 26. Obviously die block components formed to produce other shapes can be substituted, one such alternative shape being a bottle neck 27 substantially as shown in FIG. 11. The die block components are mounted on the respective jaw arms in opposed relation to each other and for vertical and lateral adjustment on the arms so as to insure their proper initial alignment with the work-piece 28 extended between them.

Operation of the apparatus insofar as it has been described, is such that during continuous rotation of shaft 12 the jaw arms 21, 22 are oscillatably rotated or vibrated short strokes so as to carry the die block components rapidly toward and away from each other to apply intermittent pressure on the work-piece 28. The work-piece comprises a length of tubular stock that is held at one of its ends in a lathe (not shown) so as to be rotated and/or advanced during operation of the machine. Such repeated pressure application, or hammering, on the work-piece reduces it into the desired configuration. However, in order to adapt the die block components to the progressive reduction in diameter of the work-piece, the die block components must be progressively advanced closer to one another as the work progresses so as to retain their surface contact with the work-piece.

In prior machines of known construction, the trunnions 23 for the jaw arms are mounted for movement toward and away from each other in independent arcs centered on the pitman connections at the lower ends of the arms. This is an objectionable form of movement because as the die block components advance toward one another on their arcs, their axis centers are lowered with respect to the longitudinal axis of the work-piece. As a consequence, the die block components do not strike the work-piece on the work piece axis but instead constantly vary their striking contact in such manner as to distort or cause marring of the work-piece.

In the herein disclosed structure the jaw arm journal trunnions 23 advance toward each other in a straight line, as at $x$—$x$ in FIG. 12, whereby the longitudinal axes of the die block components remain in horizontal alignment (line $y$—$y$ of FIG. 12) at all times with the longitudinal axis of the work piece. The invention also contemplates the provision of novel means for maintaining pressure on the journals for trunnions 23 so that the trunnions advance automatically toward one another as the shaping of the work-piece progresses and which means functions to move the die block components their maximum distance apart, when desired, to facilitate loading and unloading of the apparatus. These functions are accomplished in a novel and efficient manner by the provision of novel eccentric journal assemblies, generally indicated at 29, for the jaw arm trunnions 23.

The eccentric journal assemblies 29 are best shown in FIGS. 4, 5 and 6 which depict one of a pair of like journal assemblies in which the opposite ends of trunnions 23 are journalled. Each of these journal assemblies includes an externally toothed circular plate 31 each adapted to mesh with the toothed circular plate of the companion journal, as best shown in FIG. 1, so that rotational movement imparted to one plate 31 of one assembly is transmitted to the companion plate 31 of the other assembly. In this manner the journal assemblies of both trunnions 23 operate, in a manner to be described presently, jointly to effect common in line movement to both trunnions 23. Inasmuch as the journal assemblies are identical the following description is concerned with but one such assembly, it being understood that the description is applicable to all of said assemblies.

Referring now specifically to said FIGS. 4, 5 and 6, the journal assembly 29 is mounted in a cylindrical housing 32 that is externally flanged, as at 33, for securement to the apparatus frame 11 as by bolts passing through bolt holes 34 in said flange. The fixed housing 32 has a concentric inside wall surface, as at 35, and a concentric outside diameter or hub 36 outwardly of mounting flange 33. It also has, longitudinally outwardly of the internal wall surface 35, a concentric internal ring gear 37. The externally toothed circular plate 31 is annularly recessed on one face so as to nest snugly over the hub 36 of fixed housing 32 and lies against the outside end face of said housing.

Arranged for free rotation within fixed housing 32, and having surface bearing engagement with the concentric inside wall surface 35 thereof, is an inner housing member 38 including an end wall 39 having at least two external diametrically opposed bosses 41 to which are secured clamp plates 42 that extend through registering slots 43 in circular plate 31 for integrally connecting the circular plate 31 and inner housing member 38 for rotation as a unit. The inner housing end wall 39 is centrally apertured to provide a circular opening 44. The inner housing member 38 is eccentrically bored, as at 45, to receive nested snugly therein a trunnion bearing block 46 which has an eccentric bore 47 therein to receive the arm trunnion 23. The end wall 48 of trunnion block 46 has an external boss 49 that is concentric with its outside diameter 45 and which terminates in a gear 51 that is concentric therewith. The gear 51 has a two-to-one ratio with internal ring gear 37.

Two pairs of meshed planetary gears 52, 53 are arranged between and are meshed with the ring gear 37 and gear 51, respectively. As best shown in FIG. 4, these pairs of planetary gears are substantially diametrically opposed and one gear of each pair is journalled for free rotation on a stud 54 or 55 which are anchored firmly in and project outwardly from the end wall 39 of the inner housing member 38 (see FIG. 6). This gear arrangement is such that when rotation is imparted to circular plate 31, and to the inner housing member 38 connected to it, in a manner and by means to be described presently, the trunnion bearing block 46 is rotated in the opposite direction and at twice the speed of rotation of the circular plate 31 and housing 38.

Reference is now made to the schematic views in FIGS. 7, 8 and 9, which illustrate successive positions of the eccentric elements during movement of the circular plate 31 from what might be termed its "0" position into a position of 45° and then into a 90° position. Referring particularly to FIG. 7, which shows the parts in their "0" position, it will be observed that the axis "$a$" of the circular plate assembly, the axis "$b$" of the inner housing member eccentric bearing bore 45, and the axis "$c$" of the eccentric trunnion bearing bore 47 are spaced maximum uniform distances apart on horizontal line $x$—$x$. The line $x$—$x$ is representative of the line of movement followed during adjustment of the jaw arm trunnions 23 which are mounted in bearing bore 47. Assuming that the circular disc, and its connected inner housing 38, is rotated 45° clockwise, into the position shown in FIG. 8, the trunnion bearing block 46 will rotate counterclockwise 90° relative thereto, as also shown in FIG. 8. During this movement the axis "$b$" has orbited about axis "$a$" and come to rest out of line with axis "$a$." However, the simultaneous counter rotation of the trunnion bearing block 46 will have carried its concentric axis "$c$" toward the axis "$a$" but still on line $x$—$x$, the axis "$c$" orbiting about axis "$b$."

Continued rotation of the circular plate 31 and attached housing 38 into a 90° position in a clockwise direction, as shown in FIG. 9, will carry the axis "$b$" into the position there shown which is on a line perpendicular to line $x$—$x$. During this 90° clockwise rotation of plate 31 and housing 38, the trunnion bearing block 46 has rotated 180° counterclockwise about axis "$b$" thus carrying the axis "$c$" into register with axis "$a$." Should plate rotation be continued through 360° clockwise the axis "$b$" will orbit completely around the axis "$a$" carrying the axis "$c$" through to the other side of axis "$a$" but still on line $x$—$x$. However, in the present disclosure, the direction of rotation is reversed after about 90° rotation of the plate 31, in which instance the axis "$c$" will advance from the FIG. 7 position through to the FIG. 9 position and then back to the FIG. 7 position, always along line $x$—$x$.

Specifically, it should be noted that the axis "$b$" will orbit at all times about axis "$a$" and the axis "$c$" will orbit at all times about axis "$b$," the radius of each orbit being identical. Thus, when the trunnion bearing block 46 rotates counterclockwise relative to the inner housing member 38 at twice relative speed, each about its own axis, the axis "$c$" will always travel in a straight line $x$—$x$. Otherwise, stated, one-half revolution of the inner housing member 38 and one simultaneous counter revolution of the trunnion bearing block 46 relative to the inner housing member 38, will cause axis "$c$" (axis of trunnions 23) to move $2(r_1+r_2)$ in a straight line.

Rotational movement may be imparted to the circular plate 31 as by means of the hydraulic system disclosed in FIG. 1, where it will be observed that a piston-cylinder assembly 56 is provided with a rack 57 that meshes at all times with the ring gear on circular plate 31 of one of the journal assemblies. When thrust in one direction, the circular plate 31 will rotate, for example, clockwise, and when thrust in the other direction said circular plate 31 will rotate counterclockwise. In order to insure uniform journal rotation with respect to the trunnion bearing at each end of each trunnion 23, a transverse shaft 58 having pinions 59 thereon meshed with the teeth in both circular plates 31 of companion journals is provided.

As noted hereinabove, this mechanism is used to adjust the position of the trunnions 23 (axis "c") along a straight line x—x by rotating the circular plates in either direction. Thus it will be seen that by applying internal pressure at one end of the piston-cylinder assembly 56 during a forming operation, the die block components will steadily advance toward one another in a straight line as distinguished from an arc, thus obviating any possibility of marring the work-piece. Further, upon returning the die block components to their initial spread apart positions by applying pressure to the other end of said piston-cylinder assembly, it is possible to withdraw the formed work-piece from the die block components and to insert another piece to be worked without further die block component manipulation.

Although I have described a preferred embodiment of my invention, in considerable detail, it will be understood that the description thereof is intended to be illustrative, rather than restrictive, as many details of the structure disclosed may be modified or changed without departing from the spirit or scope of the invention. Accordingly, I do not desire to be restricted to the exact construction described.

What I claim and desire to secure by Letters Patent of the United States is:

1. In a forming apparatus for performing work on tubular stock and the like, a pair of oscillatably rockable die block arms, die block components carried by said arms and between which the tubular stock is arranged, a pai of trunnions one for each arm and about which the arms oscillatably rotate to carry the die components toward and away from the tubular stock, journals for said trunnions, and rotatable means operable for moving said journals in a straight line toward and away from each other.

2. In a forming apparatus for performing work on tubular stock and the like, a pair of rocker arms oscillatably rotatable about spaced trunnions arranged between their ends, a die block component carried by each arm, means to oscillatably rotate said arms about their trunnions for carrying the die block components toward and away from a work piece arranged between them, and means to advance said trunnions toward one another in a straight line to progressively reduce the spacing between said die block components during oscillatable rotation of said arms.

3. The apparatus recited in claim 2, in which the means comprises eccentric bearing blocks for each trunnion and means to rotate said bearing blocks.

4. In a forming apparatus for performing work on tubular stock and the like, a pair of jaw arms, trunnions for said jaw arms, die block components carried by said arms and between which the tubular stock is arranged, means to oscillatably rotate the jaw arms to carry the die block components into and out of engagement with the tubular stock, journals for said trunnions, said journals each including an eccentric bearing block in which the trunnions are mounted, and rotatable means operable to rotate the eccentric journals so as to progressively advance the trunnions toward each other during oscillatable rotation of the arms.

5. The forming apparatus recited in claim 4, in which the rotatable means includes a second eccentric element movable in a direction counter to the direction of rotation of the journals so that the trunnions advance toward one another in a straight line.

References Cited by the Examiner

UNITED STATES PATENTS

| | | | |
|---|---|---|---|
| 915,858 | 3/1909 | Hill | 74—570 |
| 1,867,981 | 7/1932 | Mudd | 74—570 |
| 2,067,399 | 1/1937 | Hughes | 74—570 |
| 2,506,736 | 5/1950 | Oschwald | 74—570 |

FOREIGN PATENTS

| | | |
|---|---|---|
| 1,112,486 | 8/1961 | Germany. |
| 38,451 | 11/1923 | Norway. |

CHARLES W. LANHAM, *Primary Examiner.*

H. D. HOINKES, *Assistant Examiner.*